United States Patent
Sip

(10) Patent No.: US 9,165,458 B2
(45) Date of Patent: Oct. 20, 2015

(54) ELECTRONIC SYSTEMS, SLAVE ELECTRONIC DEVICES AND SIGNAL TRANSMISSION METHODS

(71) Applicant: Acer Incorporated, Taipei Hsien (TW)

(72) Inventor: Kim Yeung Sip, Taipei Hsien (TW)

(73) Assignee: ACER INCORPORATED, Taipei Hsien (TW)

( * ) Notice: Subject to any disclaimer, the term of this patent is extended or adjusted under 35 U.S.C. 154(b) by 377 days.

(21) Appl. No.: 13/721,729

(22) Filed: Dec. 20, 2012

(65) Prior Publication Data

US 2013/0335137 A1  Dec. 19, 2013

(30) Foreign Application Priority Data

Jun. 14, 2012 (TW) .............................. 101121262 A

(51) Int. Cl.
- *G06F 13/00* (2006.01)
- *H03H 7/38* (2006.01)
- *G08C 19/00* (2006.01)
- *G06F 13/42* (2006.01)
- *G08C 19/36* (2006.01)

(52) U.S. Cl.
CPC ................ *G08C 19/00* (2013.01); *G06F 13/00* (2013.01); *G06F 13/4282* (2013.01); *G08C 19/36* (2013.01)

(58) Field of Classification Search
USPC ......... 710/45, 52, 60, 105, 110, 305; 333/129
See application file for complete search history.

(56) References Cited

U.S. PATENT DOCUMENTS

| | | | |
|---|---|---|---|
| 5,301,306 A | 4/1994 | Plog | |
| 6,038,623 A * | 3/2000 | Schutte | 710/100 |
| 7,932,751 B2 * | 4/2011 | Boomer | 327/44 |
| 2001/0015712 A1 | 8/2001 | Hashimoto | |
| 2006/0119291 A1 * | 6/2006 | Hung et al. | 315/291 |
| 2007/0006057 A1 | 1/2007 | Wallner et al. | |
| 2008/0320200 A1 | 12/2008 | Pederson et al. | |
| 2011/0038286 A1 * | 2/2011 | Ta et al. | 370/295 |
| 2011/0133852 A1 * | 6/2011 | Bauder et al. | 333/132 |
| 2012/0128091 A1 | 5/2012 | Fountain | |

FOREIGN PATENT DOCUMENTS

TW  201126392  8/2011

OTHER PUBLICATIONS

European Search Report dated Mar. 3, 2014.
Taiwanese language office action dated Oct. 1, 2014.
English language translation of abstract of TW 201126392 (published Aug. 1, 2011).

* cited by examiner

*Primary Examiner* — Khanh Dang
(74) *Attorney, Agent, or Firm* — McClure, Qualey & Rodack, LLP

(57) ABSTRACT

A slave electronic device is provided, including a capture unit, at least one low-speed unit and an embedded control unit. The capture unit is coupled to a host electronic device through a transmission lane to filter out a high-frequency signal part from a control signal outputted by the host electronic device to generate a low-frequency control signal, wherein the control signal has a plurality of periods and the control signal respectively has a low-frequency signal part and the high-frequency signal part during odd periods and even periods of the periods. The low-speed unit is coupled to the capture unit to operate according to the low-frequency control signal. The embedded control unit is coupled to the transmission lane for communicating with the host electronic device using a predetermined communications protocol via the high-frequency signal part.

15 Claims, 7 Drawing Sheets

ELECTRONIC SYSTEMS, SLAVE ELECTRONIC DEVICES AND SIGNAL TRANSMISSION METHODS

CROSS REFERENCE TO RELATED APPLICATIONS

This application claims priority of Taiwan Application No. 101121262, filed on Jun. 14, 2012, and the entirety of which is incorporated by reference herein.

BACKGROUND OF THE INVENTION

1. Field of the Invention

The disclosure relates generally to electronic devices and, more particularly, to slave electronic devices connected to host electronic devices.

2. Description of the Related Art

With vigorous development in the computer and communications industries, various new peripherals can easily be connected to personal computers (PCs), notebooks and so on, including the internet and external storage devices. However, for the conventional architecture, the PCs and notebooks require complex circuits to control low-speed devices (such as light emitting diodes (LEDs) or lock units). It is therefore a desire to provide an electronic system and a signal transmission method for solving this problem.

BRIEF SUMMARY OF THE INVENTION

Slave electronic devices and electronic systems and signal transmission methods using the same are provided.

An embodiment of a slave electronic device comprises a capture unit, at least one low-speed unit and an embedded control unit. The capture unit is coupled to a host electronic device through a transmission lane for filtering out a high-frequency signal part from a control signal outputted by the host electronic device to generate a low-frequency control signal, and the control signal has a plurality of periods and the control signal respectively has a low-frequency signal part and the high-frequency signal part during odd periods of the plurality of periods and even periods of the plurality of periods. The at least one low-speed unit is coupled to the capture unit for operating according to the low-frequency control signal. The embedded control unit is coupled to the transmission lane for using a predetermined communications protocol compatible for communicating with the host electronic device via the high-frequency signal part.

Another embodiment of an electronic system comprises at least a host electronic device and a slave electronic device. The host electronic device outputs a control signal through a transmission lane, wherein the control signal has a plurality of periods and the control signal respectively has a low-frequency signal part and a high-frequency signal part during odd periods of the plurality of periods and even periods of the plurality of periods. The slave electronic device is coupled to the transmission lane for filtering out the high-frequency signal part from the control signal to generate a low-frequency control signal and communicating with the host electronic device using a predetermined communications protocol via the high-frequency signal part.

In another embodiment, a signal transmission method for use in a slave electronic device coupled to a host electronic device through a transmission lane is provided. The method comprises obtaining a control signal from the transmission lane, wherein the control signal has a plurality of periods and the control signal respectively has a low-frequency signal part and the high-frequency signal part during odd periods of the plurality of periods and even periods of the plurality of periods, filtering out a high-frequency signal part from the control signal to generate a low-frequency control signal, controlling a low-speed unit of the slave electronic device according to the low-frequency control signal, and communicating with the host electronic device using a predetermined communications protocol via the high-frequency signal part.

Signal transmission methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
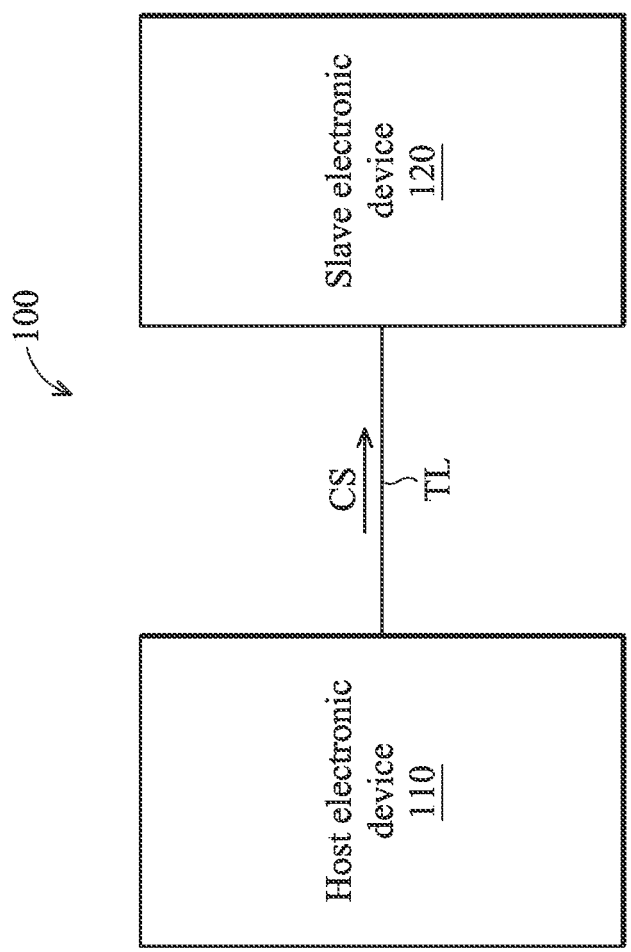
FIG. 1 is a schematic diagram illustrating an embodiment of an electronic system of the invention.

FIG. 1 is a schematic diagram illustrating an embodiment of an electronic system 100 of the invention. The electronic system 100 of the invention at least comprises a host electronic device 110 and a slave electronic device 120. The host electronic device 110 outputs a control signal CS through a transmission lane TL, wherein the control signal has a plurality of periods which comprise odd periods of the plurality of periods and even periods of the plurality of periods and the control signal has a low-frequency signal part and a high-frequency signal part during odd periods of the plurality of periods and even periods, respectively. The slave electronic device 120 is coupled to the transmission lane TL for filtering out its high-frequency signal part from the control signal CS to generate a low-frequency control signal so as to operate according to the low-frequency control signal and communicate with the host electronic device 110 using a predetermined communications protocol (e.g. the Inter-Integrated Circuit (I2C) protocol) via the high-frequency signal part.

In this embodiment, the host electronic device 110 may be electronic devices with various configurations, such as hand-held devices, portable devices, PDAs (personal digital assistant) with multiple processor systems and microprocessor-based or programmable consumer electronics, network computers, mini-computers, mainframes or any other type of similar devices. However, it is to be understood that the invention is not limited thereto.

The slave electronic device 120 may be any type of peripheral device or I/O expander. For example, the slave electronic device 120 may be a TV box, an optical disk drive, a hard disk driver (HDD), a graphic processing unit (GPU) device or a speaker. It is understood that, any electronic device having the thunderbolt interface or any interface faster than the thunderbolt interface or electronic devices which are connected in a daisy chain configuration may serve as the slave electronic device 120 in the embodiments of the invention.

Figure 2:
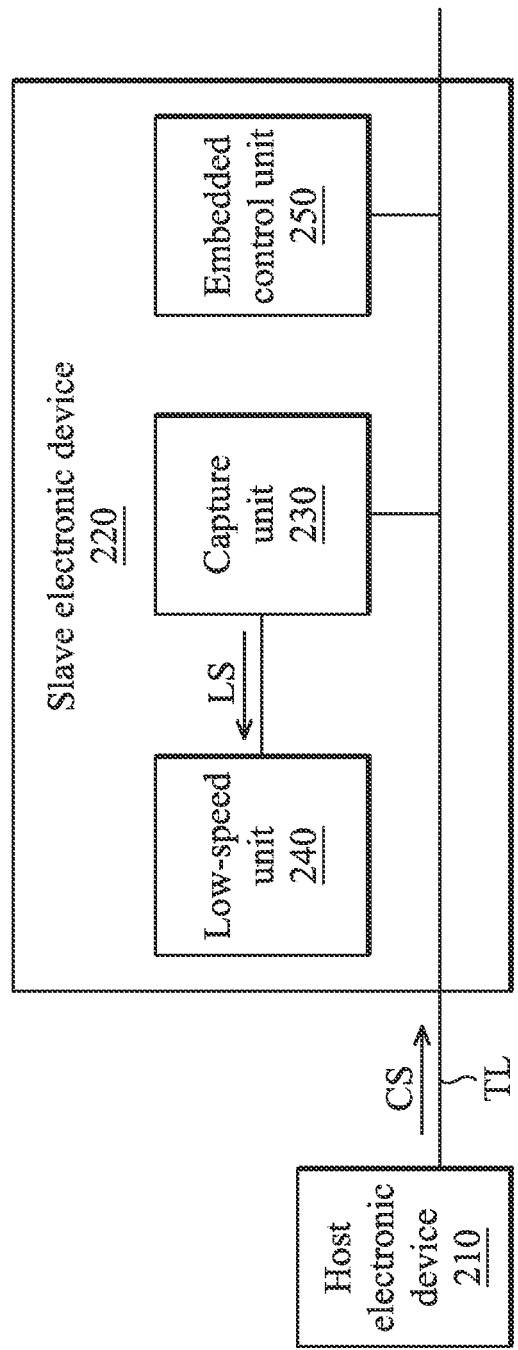
FIG. 2 is a schematic diagram illustrating an embodiment of a slave electronic device of the invention.

FIG. 2 is a schematic diagram illustrating an embodiment of a slave electronic device of the invention. As shown in FIG. 2, the slave electronic device 220 is similar to the slave electronic device 120, wherein the slave electronic device 220 at least comprises a capture unit 230, at least one low-speed unit 240 and an embedded control unit 250. The capture unit 230 is coupled to the host electronic device 210 through the transmission lane TL for filtering out the high-frequency signal part from the control signal CS outputted by the host electronic device 210 to generate a low-frequency control signal LS. The low-speed unit 240 is coupled to the capture unit 230 for operating according to the low-frequency control signal LS. For example, the low-speed unit 240 may be a motor, a lamp or a magnetic component, but the invention is not limited thereto. The embedded control unit 250 is coupled to the transmission lane TL for communicating with the host electronic device 210 using the predetermined communications protocol (e.g. the I2C protocol mode) via the high-frequency signal part of the control signal CS.

Figure 3:
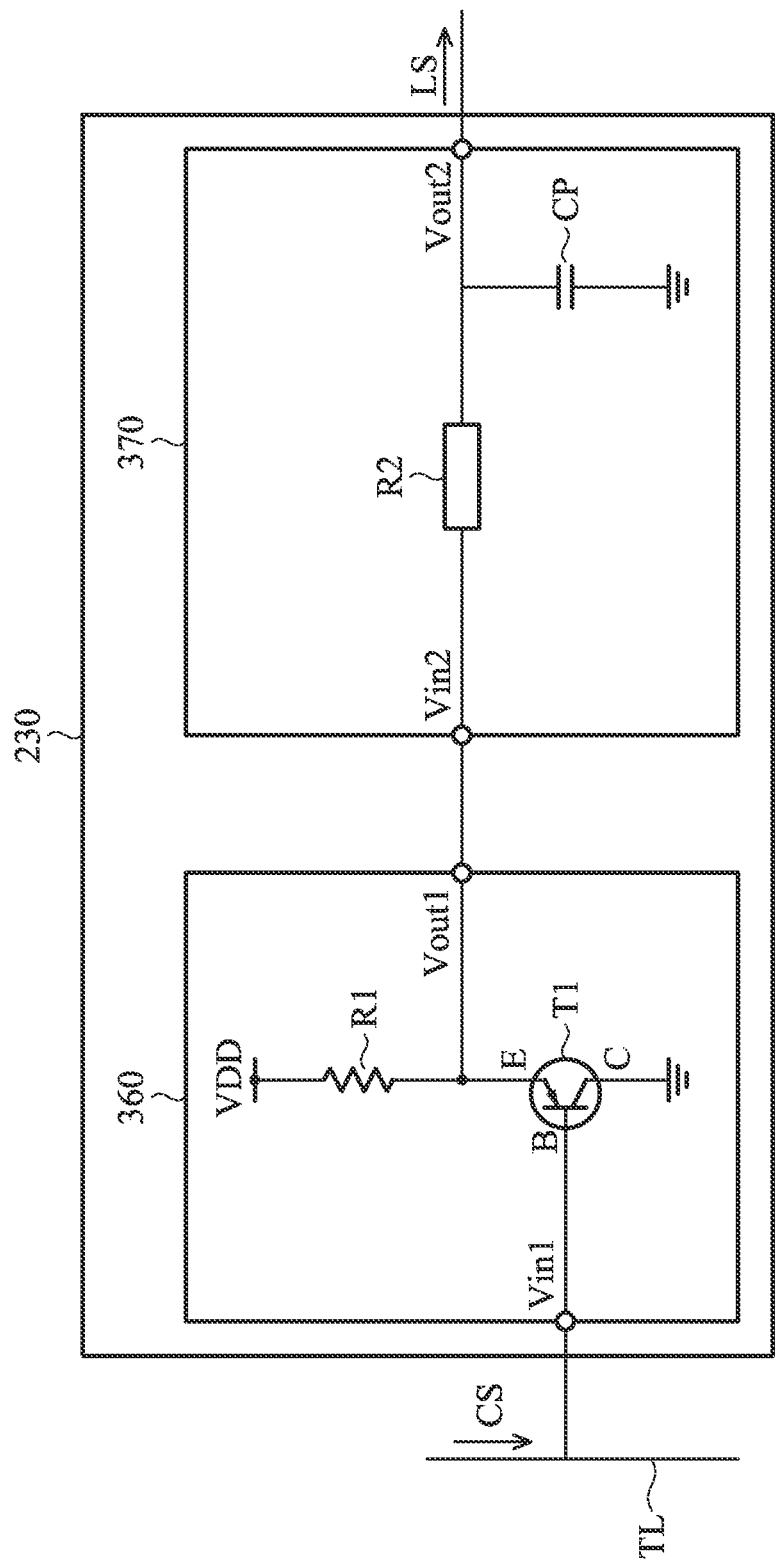
FIG. 3 is a schematic diagram illustrating an embodiment of a capture unit of the invention.

FIG. 3 is a schematic diagram illustrating an embodiment of a capture unit of the invention. As shown in FIG. 3, the capture unit may comprise a unit buffer 360 and a low-pass filter 370. In this embodiment, the unit buffer 360 may be, for example, an emitter follower, but it is not limited thereto. The unit buffer 360 may further comprise a bipolar junction transistor (BJT) T1 and a resistor R1. The base B of the bipolar junction transistor T1 is coupled to the transmission lane TL to be served as an input end Vin1 of the unit buffer 360. The collector C of the bipolar junction transistor T1 is coupled to a ground and the emitter E of the bipolar junction transistor T1 is coupled to an output end Vout1. The first resistor R1 has a first end coupled to a voltage source VDD and a second end coupled to the output end Vout1.

In this embodiment, the low-pass filter 370 is a RC filter, but the invention is not limited thereto. The low-pass filter 370 may further comprise a resistor R2 and a capacitor C2. To be more specific, the resistor R2 has a first end coupled to the output end Vout1 of the unit buffer 360 to be served as an input end Vin2 of the low-pass filter 370. The resistor R2 has a second end coupled to the output end Vout2. The capacitor CP has a first end coupled to the output end Vout2 and a second end coupled to the ground. The output end Vout2 is coupled to the low-speed unit 240 for outputting the low-frequency control signal LS to the low-speed unit 240. It is understood that, the number of bits of the low-frequency control signal LS corresponds to the number of bits of the control signal CS, and thus, the numbers of the unit buffers 360 and the low-pass filters 370 also depend on the number of the control signal CS.

Figure 4:
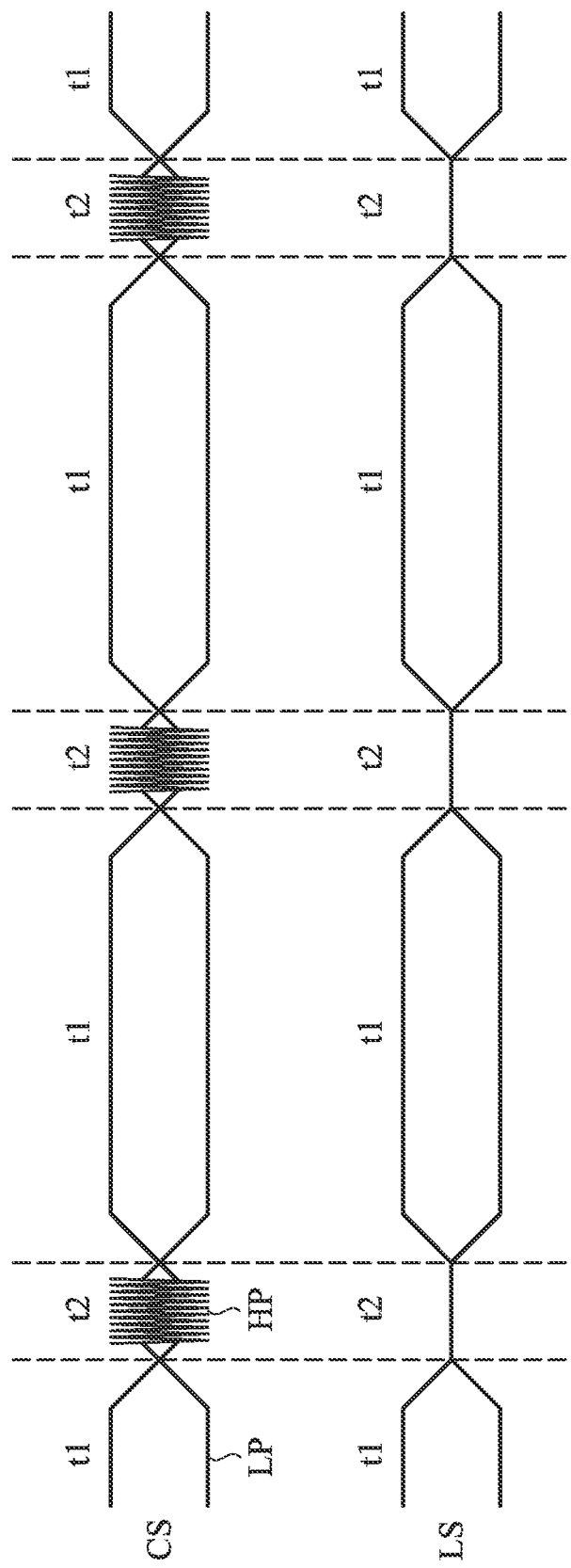
FIG. 4 is a schematic diagram illustrating an embodiment of a waveform of the control signal CS and the low-frequency control signal LS of the invention.

FIG. 4 is a schematic diagram illustrating an embodiment of a waveform of the control signal CS and the low-frequency control signal LS of the invention. As shown in FIG. 4, the control signal CS has a plurality of periods (such as a plurality of odd periods t1 and a plurality of even periods of the plurality of periods t2). The control signal CS respectively has a low-frequency signal part LP and a high-frequency signal part HP. The capture unit 230 filters out the high-frequency signal part HP from the control signal CS to generate the low-frequency control signal LS during the plurality of odd periods t1 and the plurality of even periods of the plurality of periods t2 such that the low-frequency control signal LS has no high-frequency signal part HP. It is understood that, for the low-speed unit 240 to operate normally during the plurality of even periods of the plurality of periods t2, a total length of the plurality of even periods of the plurality of periods t2 is less than an equivalent RC time constant of the low pass filter. In this embodiment, the equivalent RC time constant is $$\frac{1}{2} R \times C,$$

where R is the equivalent resistor value and C is the equivalent capacitor value.

In addition, to ensure that the embedded control unit 250 can communicate with the host electronic device 110 using the predetermined communications protocol (e.g. the Inter-Integrated Circuit (I2C) protocol mode) via the high-frequency signal part HP, the clock speed Z and the ratio Y of the plurality of even periods of the plurality of periods t2 to a sum of the odd periods of the plurality of periods t1 and the plurality of even periods of the plurality of periods t2, i.e.

$$Y = \frac{t2}{t1 + t2},$$

can be represented as $Y \times Z \geq V$, where V is the lowest speed for the predetermined communications protocol.

For example, assume that the predetermined communications protocol is the I2C protocol and the clock speed is 3.4 Mbps (i.e. Z=3.4 Mbps). The I2C bus contains three speed modes, which are a low-speed mode (standard mode, 100 kbps), a fast mode (fast mode, 400 kbps) and a high-speed mode (high-speed mode, 3.4 Mbps). When the host electronic device 110 communicates with the slave electronic device 120 in the fast mode (i.e. V=400 kbps), $$Y \geq \frac{Y}{Z} = \frac{400}{3400} = \frac{1}{8.5},$$

so that the odd periods of the plurality of periods t1 is required to be smaller than 7.5 times that of the plurality of even periods of the plurality of periods t2. When the host electronic device 110 communicates with the slave electronic device 120 in the low-speed mode (i.e. V=100 kbps), $$Y \geq \frac{Y}{Z} = \frac{100}{3400} = \frac{1}{34},$$

so that the odd periods of the plurality of periods t1 is required to be smaller than 34 times that of the plurality of even periods of the plurality of periods t2.

Figure 5:
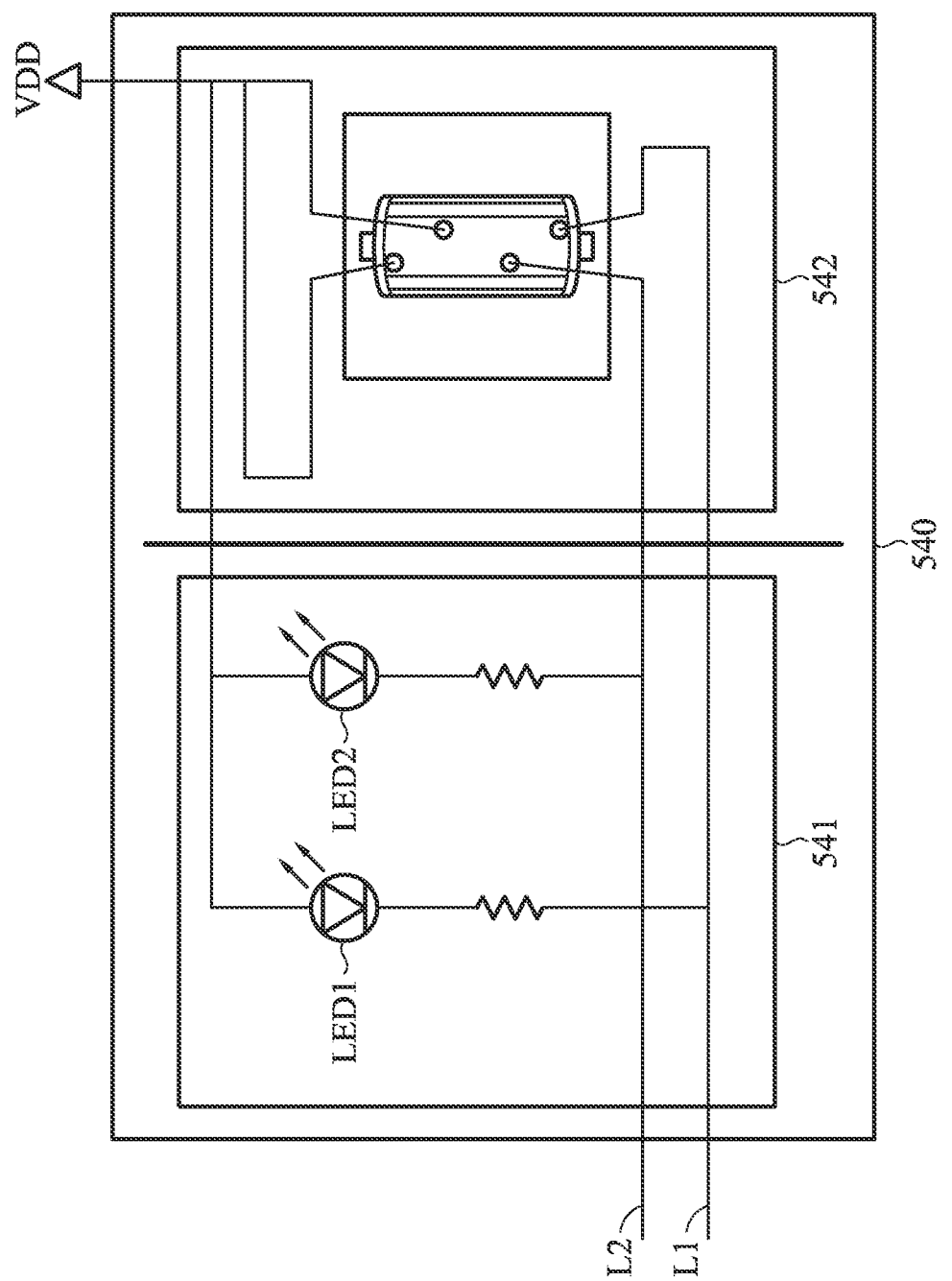
FIG. 5 is a schematic diagram illustrating an embodiment of a low-speed unit of the invention.

FIG. 5 is a schematic diagram illustrating an embodiment of a low-speed unit of the invention. As shown in FIG. 5, the low-speed unit 540 further comprises a light emitting unit 541 and a lock unit 542. In some embodiments, the low-speed unit 540 may only comprise the light emitting unit 541 or the lock unit 542, but the invention is not limited thereto. In this embodiment, the low-speed unit 540 may further comprise a plurality of light emitting diodes (LEDs). As the low-frequency control signal LS (the control signal CS) has two bits, the light emitting unit 541 has two LEDs, LED1 (e.g. a green light LED) and LED2 (e.g. a blue light LED), coupled to the transmission lines L1 and L2, respectively.

The lock unit 542 may be a motor lock for selectively operating in a lock state or an unlock state according to the low-frequency control signal LS. For example, when the voltage levels of the first bit and the second bit (i.e. the transmission lines L1 and L2) of the low-frequency control signal LS are a first voltage level (e.g. a low voltage level) and a second voltage level (e.g. a high voltage level), respectively, the lock unit 542 operates in the lock state and the LED LED1 emits light while the LED LED2 does not. When the voltage levels of the first bit and the second bit (i.e. the transmission lines L1 and L2) of the low-frequency control signal LS are the second voltage level (e.g. the high voltage level) and the first voltage level (e.g. the low voltage level), respectively, the lock unit 542 operates in the unlock state and the LED LED2 emits light while the LED LED1 does not. Therefore, users may determine the state of the lock unit 542 based on the color of the light emitting unit 541.

Additionally, when the predetermined communications protocol is the I2C protocol and the voltage levels of the transmission lines L1 and L2 are both the second voltage level (e.g. the high voltage level), the I2C of the embedded control unit 250 operates in an idle state. When the voltage levels of the transmission lines L1 and L2 are the second voltage level (e.g. the high voltage level) and the first voltage level (e.g. the low voltage level), respectively, the I2C of the embedded control unit 250 operates in an invalid state. When the voltage level of the transmission line L1 is the first voltage level and the voltage level of the transmission line L2 changes to the second voltage level after one clock period, the I2C of the embedded control unit 250 operates in the invalid state. Therefore, the operation of the I2C will not be affected by the low-frequency signal part LP.

Figure 6:
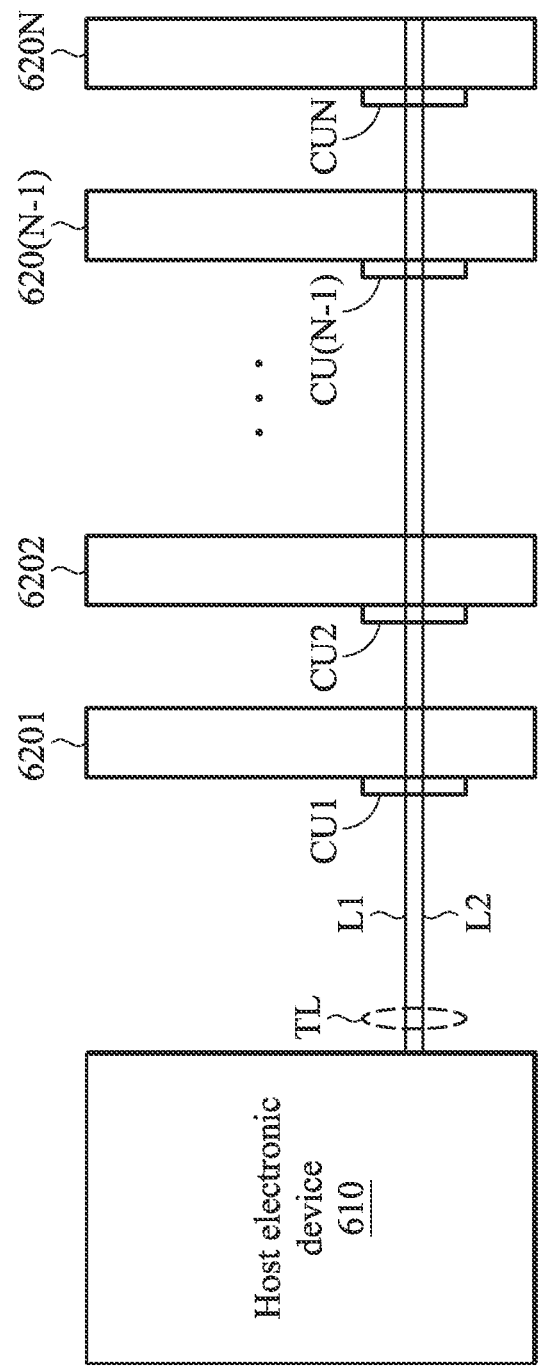
FIG. 6 is a schematic diagram illustrating an embodiment of an electronic system of the invention.

FIG. 6 is a schematic diagram illustrating an embodiment of an electronic system of the invention. As shown in FIG. 6, the electronic system 600 includes a host electronic device 610 and a plurality of slave electronic devices 6201-620N. Each of the slave electronic devices 6201-620N can be the slave electronic device 120 while the host electronic device 610 can be the host electronic device 110. The slave electronic device 6202 is coupled to the slave electronic device 6201 in a daisy chain configuration and the slave electronic device 620N is coupled to the slave electronic device 620(N−1) in a daisy chain configuration. In this embodiment, each of the slave electronic devices 6201-620N has a connection unit (e.g. the connection unit CU1) for connecting to the transmission lane TL and the capture unit 230 and the low-speed unit 240 are configured within the connection unit.

For example, the capture unit 230 and the low-speed unit 240 of the slave electronic device 6201 are configured within the connection unit CU1, and thus, the light emitting unit 541 displays a first predetermined color (e.g. the green light) and the lock unit 542 of the connection unit CU1 is in the lock state when the slave electronic device 6202 is performing data transmission with the slave electronic device 6201 (or the host electronic device 110). When the slave electronic device 6202 is in the idle state, the light emitting unit 541 displays a second predetermined color (e.g. the blue light) and the lock unit 542 of the connection unit CU2 is in the unlock state. In some embodiments, the connection units CU1-CUN are mini display port connecting units and the transmission lane TL is a transmission lane connected to the mini display port buses.

Figure 7:
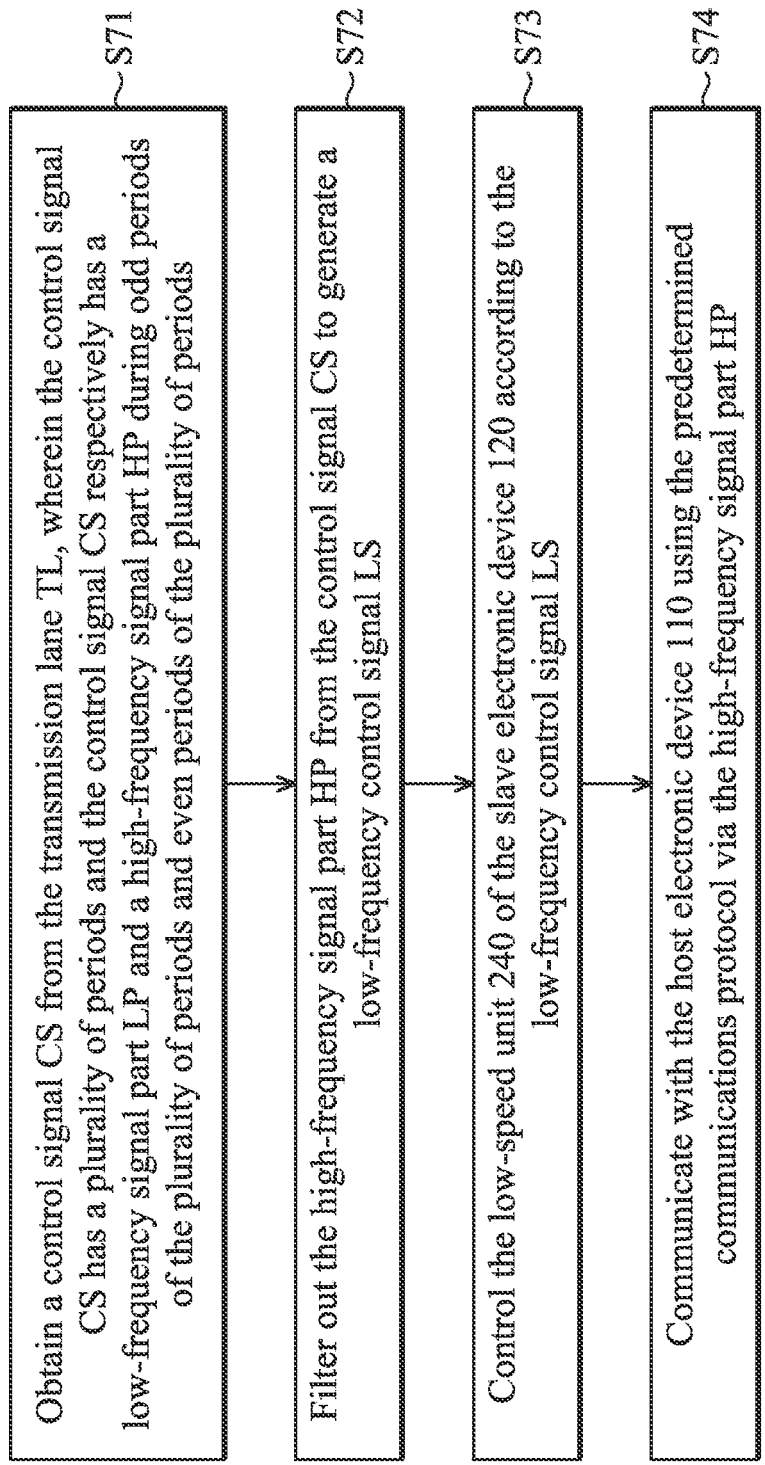
FIG. 7 is a flowchart of an embodiment of a signal transmission method of the invention.

FIG. 7 is a flowchart of an embodiment of a signal transmission method for use in the slave electronic device 120 that is coupled to the host electronic device 110 through the transmission lane TL of the invention. As shown in FIG. 7, the signal transmission method comprises the following steps.

In step S71, a control signal CS is obtained from the transmission lane TL, wherein the control signal CS has a plurality of periods and the control signal CS respectively has a low-frequency signal part LP and a high-frequency signal part HP during odd periods of the plurality of periods t1 and even periods of the plurality of periods t2. In step S72, the high-frequency signal part HP is filtered out from the control signal CS to generate a low-frequency control signal LS. In step S73, the low-speed unit 240 of the slave electronic device 120 is controlled according to the low-frequency control signal LS. In step S74, the predetermined communications protocol is utilized by the slave electronic device 120 to communicate with the host electronic device 110 via the high-frequency signal part HP.

In this embodiment, the low-speed unit 240 has the light emitting unit 541, and thus, the light emitting unit 541 is controlled to emit light selectively according to the low-frequency control signal LS in step S73. In some embodiments, the low-speed unit 240 has the lock unit 542, and thus, the lock unit 542 is controlled to operate in a lock state or an unlock state according to the low-frequency control signal LS in step S73.

As the low-speed unit 240 is configured in the connection unit (e.g. the connection unit CUI) and the space of the connection unit is limited, the slave electronic device 120 in this embodiment is only required to utilize a capture unit 230 having a smaller size to control the low-speed unit 240 according to the control signal CS without configuring the embedded controller unit with a larger size for controlling the low-speed unit 240. Thus, the low-speed unit 240 of this embodiment can operate (such as light emission or unlocking by the low-speed unit 240) according to the state of the transmission lane TL.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A slave electronic device, comprising:
a capture unit, coupled to a host electronic device through a transmission lane, filtering out a high-frequency signal part from a control signal outputted by the host electronic device to generate a low-frequency control signal, wherein the control signal has a plurality of periods and the control signal respectively has a low-frequency signal part and the high-frequency signal part during odd periods of the plurality of periods and even periods of the plurality of periods;
at least one low-speed unit, coupled to the capture unit, operating according to the low-frequency control signal;
an embedded control unit, coupled to the transmission lane, communicating with the host electronic device using a predetermined communications protocol via the high-frequency signal part,
wherein the capture unit further comprises:
a unit buffer, obtaining the control signal from the transmission lane; and a low-pass filter, filtering out the high-frequency signal part from the control signal to generate the low-frequency control signal.

2. The slave electronic device of claim 1, wherein the unit buffer is an emitter follower, comprising:
   a bipolar junction transistor, having a base coupled to the transmission lane, a collector coupled to a ground and an emitter coupled to a first output end; and
   a first resistor, having a first end coupled to a voltage source and a second end coupled to the first output end,
   wherein the low-pass filter is a RC filter, comprising:
   a second resistor, having a first end coupled to a first output end of the unit buffer and a second end coupled to a second output end of the unit buffer for outputting the low-frequency control signal to the low-speed unit; and
   a capacitor, having a first end coupled to the second output end and a second end coupled to a ground.

3. The slave electronic device of claim 1, wherein the low-speed unit is a light emitting unit for selectively emitting light according to the low-frequency control signal, and the light emitting unit respectively operates in a light-emitting state and a turn-off state when the voltage levels of the low-frequency control signal are at the first and second voltage levels, respectively.

4. The slave electronic device of claim 1, wherein the low-speed unit is a lock unit for selectively operating in a lock state or an unlock state according to the low-frequency control signal, and the low-frequency control signal includes a plurality of bits such that when the voltage levels of the first bit and the second bit of the low-frequency control signal are first and second voltage levels, respectively, the lock unit operates in the lock state, and when the voltage levels of the first bit and the second bit of the low-frequency control signal are the second and the first voltage levels, respectively, the lock unit operates in the unlock state.

5. The slave electronic device of claim 1, wherein a total length of the even periods of the plurality of periods is less than an equivalent RC time constant of the low pass filter.

6. The slave electronic device of claim 1, wherein when a clock speed is Z and a ratio of the even periods of the plurality of periods to a sum of the odd periods of the plurality of periods and the even periods of the plurality of periods is Y, Y×Z≥V, where V is the lowest speed for the predetermined communications protocol.

7. An electronic system, comprising:
   a host electronic device, outputting a control signal through a transmission lane, wherein the control signal has a plurality of periods and the control signal respectively has a low-frequency signal part and a high-frequency signal part during odd periods of the plurality of periods and even periods of the plurality of periods;
   a slave electronic device, coupled to the transmission lane, filtering out the high-frequency signal part from the control signal to generate a low-frequency control signal and communicating with the host electronic device using a predetermined communications protocol via the high-frequency signal part,
   wherein the slave electronic device further comprises a capture unit coupled to the transmission lane for filtering out the hiqh-frequency signal part from the control signal to generate the low-frequency control signal and the capture unit further comprises:
   a unit buffer, obtaining the control signal from the transmission lane; and
   a low-pass filter, filtering out the high-frequency signal part from the control signal to generate the low-frequency control signal.

8. The electronic system of claim 7, wherein the slave electronic device further comprises:
   at least one low-speed unit, coupled to the capture unit, operating according to the low-frequency control signal; and
   an embedded control unit, coupled to the transmission lane, communicating with the host electronic device using the predetermined communications protocol via the high-frequency signal part.

9. The electronic system of claim 8, wherein the low-speed unit is a light emitting unit for selectively emitting light according to the low-frequency control signal, and the light emitting unit respectively operates in a light-emitting state and a turn-off state when the voltage levels of the low-frequency control signal are at the first and second voltage levels, respectively.

10. The electronic system of claim 8, wherein the low-speed unit is a lock unit for selectively operating in a lock state or an unlock state according to the low-frequency control signal, and the low-frequency control signal includes a plurality of bits such that when the voltage levels of the first bit and the second bit of the low-frequency control signal are first and second voltage levels, respectively, the lock unit operates in the lock state, and when the voltage levels of the first bit and the second bit of the low-frequency control signal are the second and the first voltage levels, respectively, the lock unit operates in the unlock state.

11. The electronic system of claim 7, wherein a total length of the even periods of the plurality of periods is less than an equivalent RC time constant of the low pass filter.

12. The electronic system of claim 7, wherein when a clock speed is Z and a ratio of the even periods of the plurality of periods to a sum of the odd periods of the plurality of periods and the even periods of the plurality of periods is Y, Y×Z≥V, where V is the lowest speed for the predetermined communications protocol.

13. A signal transmission method for use in a slave electronic device coupled to a host electronic device through a transmission lane, comprising:
   obtaining a control signal from the transmission lane, wherein the control signal has a plurality of periods and the control signal respectively has a low-frequency signal part and the high-frequency signal part during odd periods of the plurality of periods and even periods of the plurality of periods;
   filtering out a high-frequency signal part from the control signal to generate a low-frequency control signal;
   controlling a low-speed unit of the slave electronic device according to the low-frequency control signal;
   communicating with the host electronic device using a predetermined communications protocol via the high-frequency signal part,
   wherein when the low-speed unit is a light emitting unit, the step of controlling the low-speed unit further comprises:
   controlling the light emitting unit to selectively emit light according to the low-frequency control signal; and
   when the low-speed unit is a lock unit, controlling the lock unit to operate in a lock state or an unlock state according to the low-frequency control signal.

14. The signal transmission method of claim 13, wherein a total length of the even periods of the plurality of periods is less than an equivalent RC time constant of the low pass filter.

15. The signal transmission method of claim 13, wherein when a clock speed is Z and a ratio of the even periods of the plurality of periods to a sum of the odd periods of the plurality of periods and the even periods of the plurality of periods is y, Y×Z≥V, where V is the lowest speed for the predetermined communications protocol.

\* \* \* \* \*